(12) United States Patent
Kim (10) Patent No.: US 10,199,772 B2
(45) Date of Patent: Feb. 5, 2019

(54) POWER DISTRIBUTION APPARATUS WITH ROTARY OPENING/CLOSING TYPE PLUG FIXING MEANS FOR COMMUNICATIONS EQUIPMENT RACK

(71) Applicant: Ki Poong Kim, Bucheon-si (KR)

(72) Inventor: Ki Poong Kim, Bucheon-si (KR)

( * ) Notice: Subject to any disclaimer, the term of this patent is extended or adjusted under 35 U.S.C. 154(b) by 27 days.

(21) Appl. No.: 15/534,570

(22) PCT Filed: Nov. 25, 2015

(86) PCT No.: PCT/KR2015/012689
§ 371 (c)(1),
(2) Date: Jun. 9, 2017

(87) PCT Pub. No.: WO2016/108435
PCT Pub. Date: Jul. 7, 2016

(65) Prior Publication Data
US 2018/0351299 A1    Dec. 6, 2018

(30) Foreign Application Priority Data
Dec. 30, 2014 (KR) .................. 10-2014-0193217

(51) Int. Cl.
*H01R 4/60* (2006.01)
*H01R 13/639* (2006.01)
*H01R 33/92* (2006.01)

(52) U.S. Cl.
CPC ......... *H01R 13/6395* (2013.01); *H01R 33/92* (2013.01)

(58) Field of Classification Search
CPC .............. H01R 13/6395; H01R 25/162; H01R 9/2608; H01R 31/06
USPC .......................................... 439/211, 110, 652
See application file for complete search history.

(56) References Cited

U.S. PATENT DOCUMENTS

| 8,512,065 | B2 * | 8/2013 | Byrne | H01R 4/2433 439/391 |
| 8,616,921 | B2 * | 12/2013 | Byrne | H01R 25/00 439/214 |
| 9,246,317 | B2 * | 1/2016 | Byrne | H02G 3/105 |
| 2010/0317223 | A1 * | 12/2010 | Byrne | H01R 13/514 439/540.1 |
| 2012/0009820 | A1 * | 1/2012 | Byrne | H02G 3/0437 439/625 |

FOREIGN PATENT DOCUMENTS

| KR | 20-0161378 | 11/1999 |
| KR | 20-0183104 | 3/2000 |
| KR | 20-0215435 | 3/2001 |
| KR | 10-0945161 | 3/2010 |

(Continued)

*Primary Examiner* — Hae Moon Hyeon
(74) *Attorney, Agent, or Firm* — Lex IP Meister, PLLC (57) ABSTRACT

A power distribution apparatus with a rotary-opening/closing type plug fixing device for a communication equipment rack is provided. The power distribution apparatus prevents poor connection resulting from accidentally touching other power plugs by fixing the power plug with the plug fixing device which rotates in one direction, and allows the separation of the plug fixing device with only one hand when separating the power plug, thereby enabling users to conveniently separate the power plug even in a narrow space.

7 Claims, 7 Drawing Sheets

(56) References Cited

FOREIGN PATENT DOCUMENTS

| KR | 10-2010-0114231 | 10/2010 |
|----|-----------------|---------|
| KR | 10-1017115 | 2/2011 |
| KR | 20-2011-0003157 | 3/2011 |
| KR | 10-1207296 | 11/2012 |
| KR | 20-2013-0002744 | 5/2013 |
| KR | 20-0467075 | 5/2013 |

* cited by examiner

POWER DISTRIBUTION APPARATUS WITH ROTARY OPENING/CLOSING TYPE PLUG FIXING MEANS FOR COMMUNICATIONS EQUIPMENT RACK

BACKGROUND

Technical Field

The present invention relates generally to a power distribution apparatus with a rotary-opening/closing type plug fixing means for a communication equipment rack. More particularly, the present invention relates to a power distribution apparatus with a rotary-opening/closing type plug fixing means for a communication equipment rack, wherein the plug fixing means is rotated in one direction, such that when a user performs connection work of a power plug connected to a communication equipment rack having a plurality of communication equipment and electronic equipment, it is possible to prevent connection failure resulting from accidentally touching other power plugs, and when a user performs disconnection work of the power plug, the plug fixing means can be removed by only one hand.

DESCRIPTION OF RELATED ART

Due to the rapid development of the information communication industry in recent years, network environments such as a telephone network, an internet communication network, and a satellite communication network are gradually expanding, and communication devices for providing various services are increasingly diversified based on such circumstances.

According to this trend, communication base stations, relay facilities, closed circuit television (CCTV) communication facilities, and the like for transmitting information and communication data are gradually increasing, so that stable and efficient integrated management and maintenance of various communication equipment are required.

In an effort to meet such a demand, a rack cabinet, which is often referred to as a "communication equipment rack", is commonly used as a facility structure installed to store various communication equipment. Embodiment thereof are disclosed in detail Korean Patent No. 10-0945161, Korean Utility Model Registration No. 20-0215435, and Korean Patent Application Publication No. 10-2010-0114231, respectively.

Meanwhile, a conventional communication equipment rack that contains various communication equipment therein is provided with a power distribution unit (PDU) having a plurality of power plugs connected thereto and distributing power to the communication equipment.

However, the conventional power distribution unit is problematic in that there is no fixing means for fixing the power plugs from the outside after the power plugs are connected, so when a user performs connection or disconnection operation of a power plug in the conventional power distribution unit, the other connected power plugs are disturbed and thus the contact force of terminals thereof is lowered, and power failure occurs due to deviation of the power plugs.

On the other hand, in order to prevent the contact force of the power plugs connected to the conventional power distribution device from being lowered, a method of fixing the power plugs by a fixing means such as a cable tie is used. However, there is a problem in that installation and removal operations of the fixing means are very inconvenient when the power plugs are connected and disconnected.

In addition, since the conventional power distribution device is installed in the corner of the communication equipment rack that is not visible to the naked eye, the work space for connection or disconnection of the power plug is very limited. Accordingly, there is no way to visually recognize the relaxed state of the power plugs fixed with the fixing means of the cable tie or the like, and thus a disconnection operation becomes very difficult.

SUMMARY OF THE INVENTION

Accordingly, the present invention has been made keeping in mind the above problems occurring in the prior art, and an object of the present invention is to provide a power distribution apparatus with a rotary-opening/closing type plug fixing means for a communication equipment rack, wherein when a user performs connection operation of a power plug connected to a communication equipment rack having a plurality of communication equipment and electronic equipment, the power plug is fixed by the plug fixing means rotated in one direction, whereby connection failure resulting from accidentally touching other power plugs is prevented, and when a user performs disconnection operation of the power plug, the plug fixing means is removed by only a single hand of a user, thereby enabling a user to conveniently remove the power plug in a narrow space and to easily check the relaxed state of the power plug.

In order to accomplish the above object, the present invention provides a power distribution apparatus with a rotary-opening/closing type plug fixing means for a communication equipment rack, wherein a plurality of power plugs is connected with the power distribution apparatus, the power distribution apparatus including: a box-shaped plug connection part provided with a plug insertion hole formed correspondingly to a power plug, and a terminal transferring power by being connected to the power plug in the plug insertion hole; a slide part provided with a box-shaped seat casing open at upper and lower sides thereof such that the plug connection part is inserted into the seat casing, and a slide protrusion lengthwisely protruding on each side of the seat casing; a plug fixing means seated on an upper part of the slide part and provided with a plug insert opening formed by centrally cutting a surface of the plug fixing means in one direction such that the plug fixing means presses downward a surface of an upper part of the power plug when the power plug is connected with the power distribution apparatus; and a casing part provided with a rectangular pipe-shaped casing body open at an upper side thereof such that the slide part is seated in the casing body, and a slide groove lengthwisely formed on an inner surface of each side of the casing body and into which the slide protrusion is inserted.

The slide part may be provided at an end of the upper part thereof with a hinge hole formed through an each side of the slide part such that the plug fixing means is hinged to the slide part, and the plug fixing means may be provided at an end thereof with a hinge protrusion protruding from each side of the plug fixing means and rotatably inserted into the hinge hole.

The slide part may be provided at an end of the upper part thereof with a seat step depressed downward, and the plug fixing means may be provided at an end thereof with a snap protrusion seated in the seat step and snapped into the slide groove when the plug fixing means is closed.

The plug fixing means may be provided at the end thereof with a U-shaped tension part extending downward and then upward from the plug fixing means such that the snap protrusion is elastically snapped into the slide groove.

The tension part may be provided with a grip protrusion protruding outward from an upper end of the tension part such that the tension part is prevented from slipping when the tension part is pressed by a user's hand.

The slide part may be provided at an end of the upper part thereof with a recess recessed downward such that an end of the plug fixing means coupled to the slide part is rotated.

The recess may be provided on an inner surface thereof with a rotation guide part elastically pressing the end of the plug fixing means when the plug fixing means is rotated, wherein the rotation guide part may be provided with an elastic piece provided on the inner surface of the recess by being cut from an upper portion of the inner surface of the recess to a predetermined depth, and a pressing protrusion protruding inwardly from an upper end of the elastic piece.

A power distribution apparatus with a rotary-opening/closing type plug fixing means for a communication equipment rack according to the present invention has the following effects.

First, by providing a plug fixing means fixing a power plug and rotated in one direction, when connecting a power plug to the power distribution apparatus provided in the communication equipment rack having various electronic equipment, three surfaces of an upper part of the power plug can be completely fixed by the plug fixing means, and thus it is possible to prevent the connection failure.

Second, by providing a snap protrusion rotated in one direction and elastically snapped into a slide groove of a casing part, when the power plug is removed from the power distribution apparatus provided in the narrow communication equipment rack, the plug fixing means can be easily removed by single hand of a user.

Third, by providing a U-shaped tension part formed at an end of the plug fixing means by extending downward and then upward from the plug fixing means, the snap protrusion can be elastically snapped into the slide groove, and thus the locking and releasing of the plug fixing means can be performed conveniently.

Fourth, by providing a grip protrusion protruding outward from an upper end of the tension part, slipping of the plug fixing means can be prevented when the tension part is pressed by a user's hand, thereby significantly improving the workability.

Fifth, by providing a recess recessed downward at an end of an upper part of a slide part such that an end of the plug fixing means coupled to the slide part is rotated, so when the plug fixing means is rotated, the rotation radius of the end of the plug fixing means is prevented from being interfered, and thus the plug fixing means can be rotated without interruption.

Sixth, by providing a hinge protrusion protruding from each side of the plug fixing means, which serves as a rotation axis, the plug fixing means is released to be fully opened to a side of the power plug, and thus it is possible to solve the problem that the power plug is caught by the plug fixing means when the power plug is removed.

Seventh, by providing a plug fixing means that is lifted slightly with a power plug when the power plug is relaxed by an external action, that is, a slight deviation occurs, it is possible to visually easily check the connection state of a plurality of power plugs connected to the communication equipment rack.

DETAILED DESCRIPTION OF THE INVENTION

Hereinafter, exemplary embodiment of the present invention will be described in detail with reference to the accompanying drawings.

As shown in FIGS. 1 to 4, a power distribution apparatus with a rotary-opening/closing type plug fixing means for a communication equipment rack according to the present invention, is a power distribution apparatus 1 for a communication equipment rack, wherein a plurality of power plugs P are connected with the power distribution apparatus, the power distribution apparatus including: a box-shaped plug connection part 10 provided with a plug insertion hole 11 formed correspondingly to a power plug P, and a terminal transferring power by being connected to the power plug P in the plug insertion hole 11; a slide part provided with a box-shaped seat casing 21 open at upper and lower sides thereof such that the plug connection part 10 is inserted into the seat casing, and a slide protrusion 22 lengthwisely protruding on each side of the seat casing 21; a plug fixing means 30 seated on an upper part of the slide part 20 and provided with a plug insert opening 31 formed by centrally cutting a surface of the plug fixing means in one direction such that the plug fixing means presses downward a surface of an upper part of the power plug P when the power plug is connected with the power distribution apparatus; and a casing part 40 provided with a rectangular pipe-shaped casing body 41 open at an upper side thereof such that the slide part 20 is seated in the casing body 41, and a slide groove 42 lengthwisely formed on inner surface of each side of the casing body 41 and into which the slide protrusion 22 is inserted.

Meanwhile, the terminal 12 may protrude downward from the plug connection part 10 and may be connected to a main terminal (not shown) provided in the casing part 40.

Here, the plug fixing means 30 may be formed in a "U" shape such that the surface thereof is open and thus the plug fixing means 30 presses and fixes the surface of an upper part of the power plug P, that is, three surfaces of a plug locking step h.

Further, the plug connection part 10 may be provided with a stop rim 13 protruding from an upper edge of the plug connection part, such that the plug connection part 10 is stopped at a predetermined height when being inserted into the seat casing 21 in a direction from the upper side to the lower side thereof.

Further, the slide part 20 is provided at an end of the upper part thereof with a hinge hole 23 formed through each side of the slide part 20 such that the plug fixing means 30 is hinged to the slide part; and the plug fixing means 30 is provided at an end thereof with a hinge protrusion 32 protruding from each side of the plug fixing means, and rotatably inserted into the hinge hole 23.

Further, the slide part 20 is provided at an end of the upper part thereof with a seat step 24 depressed downward, and the plug fixing means 30 is provided at an end thereof with a snap protrusion 33 seated in the seat step 24 and snapped into the slide groove 42 when the plug fixing means 30 is closed.

Meanwhile, the snap protrusion 33 may be provided on a straight line with the slide protrusion 22, and the snap protrusion 33 may be formed in a downwardly inclined shape in cross section such that the snap protrusion is easily inserted into the slide groove 42 while being prevented from being separated therefrom.

Further, the plug fixing means 30 is provided at an end thereof with a U-shaped tension part 34 extending downward and then upward from the plug fixing means 30, such that the snap protrusion 33 is elastically snapped into the slide groove 42

Meanwhile, the tension part 34 may have any shape without being limited to a "U" shape as long as it extends downward and then upward.

Further, the tension part 34 is provided with a grip protrusion 35 protruding outward from an upper end of the tension part such that the tension part is prevented from slipping when pressed by a user's hand.

Further, the slide part 20 is provided at an end of the upper part thereof with a recess 25 recessed downward, such that an end of the plug fixing means 30 coupled to the slide part is rotated.

Meanwhile, a bottom surface of the recess 25 may have a hemispherical shape in cross section such that the plug fixing means 30 is rotated without interference.

Figure 1:
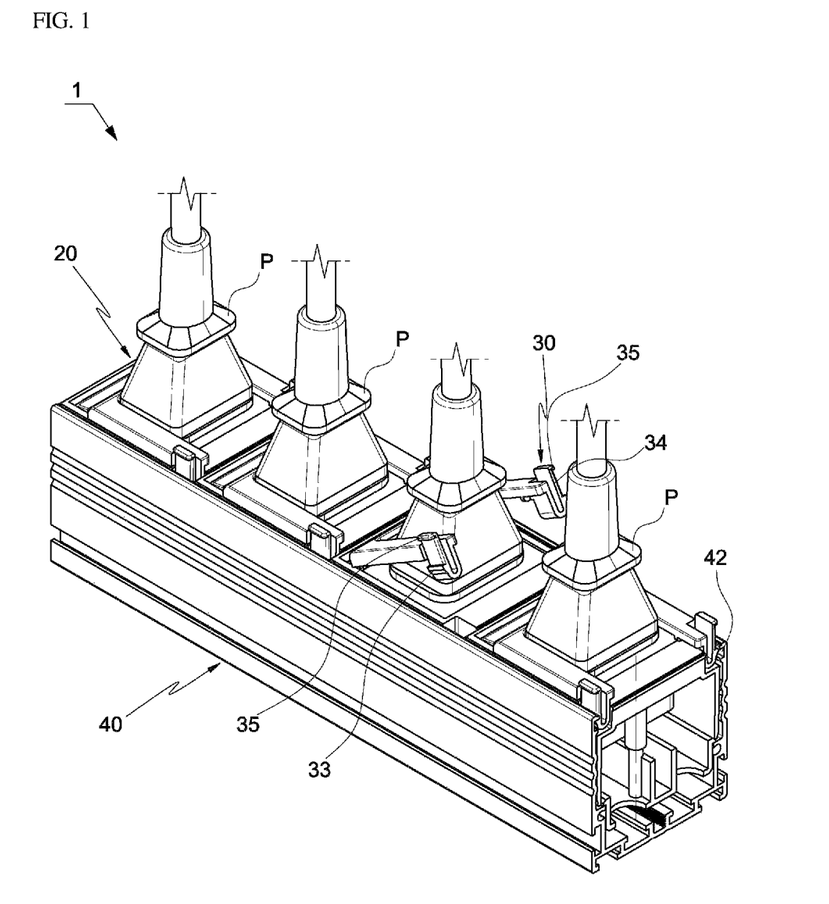
FIG. 1 is a perspective view showing a power distribution apparatus for a communication equipment rack according to the present invention.
Figure 2:
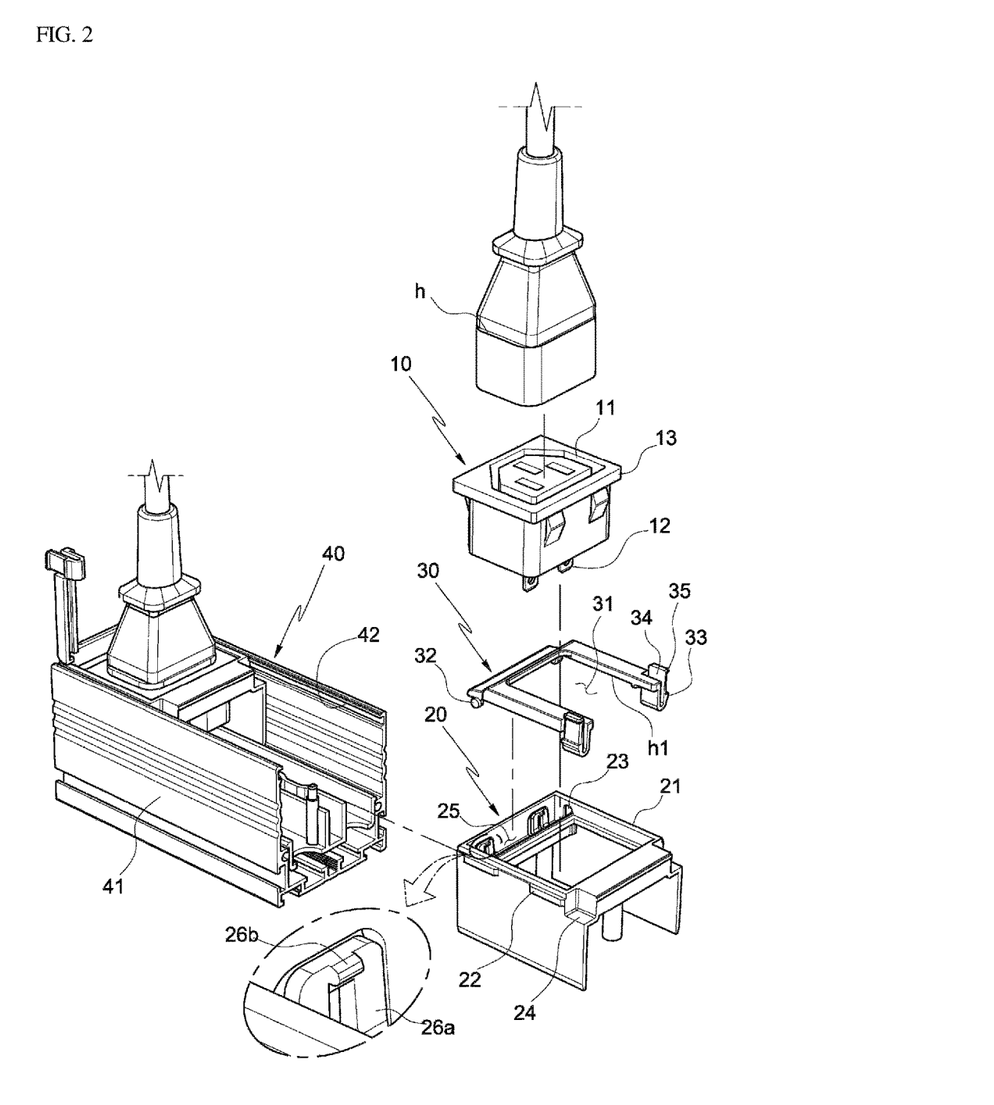
FIG. 2 is an exploded perspective view showing the power distribution apparatus for the communication equipment rack according to the present invention.
Figure 3A:
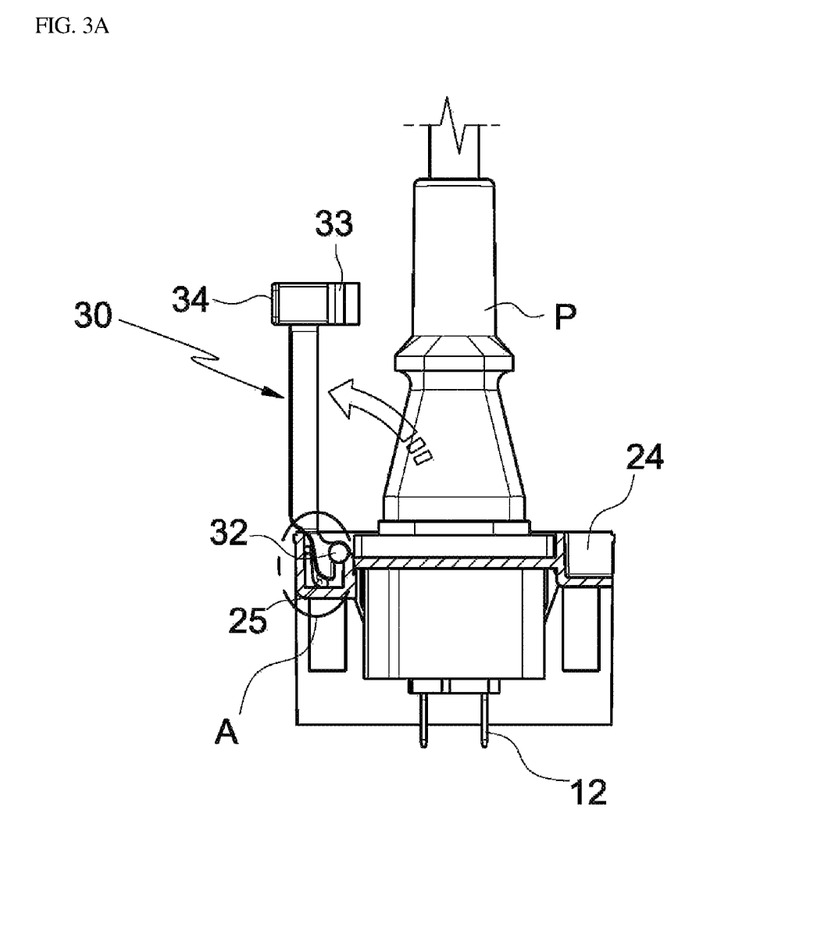
FIGS. 3A and 3B are front cross-sectional views showing operation of a plug fixing means according to the present invention.
Figure 3B:
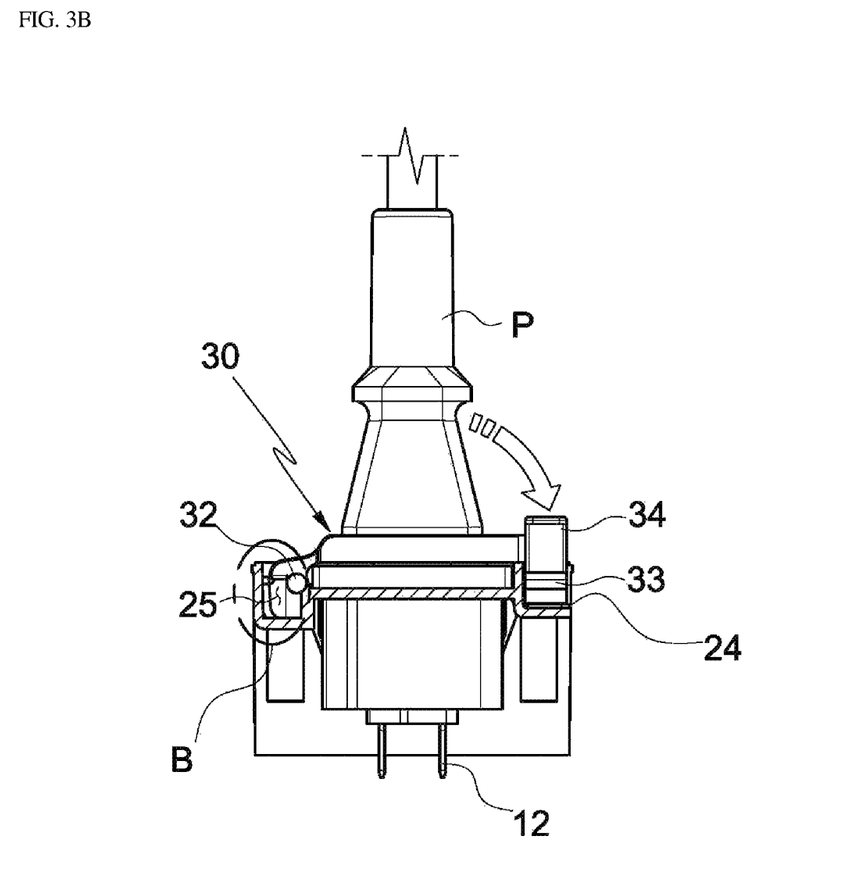
Figure 4:
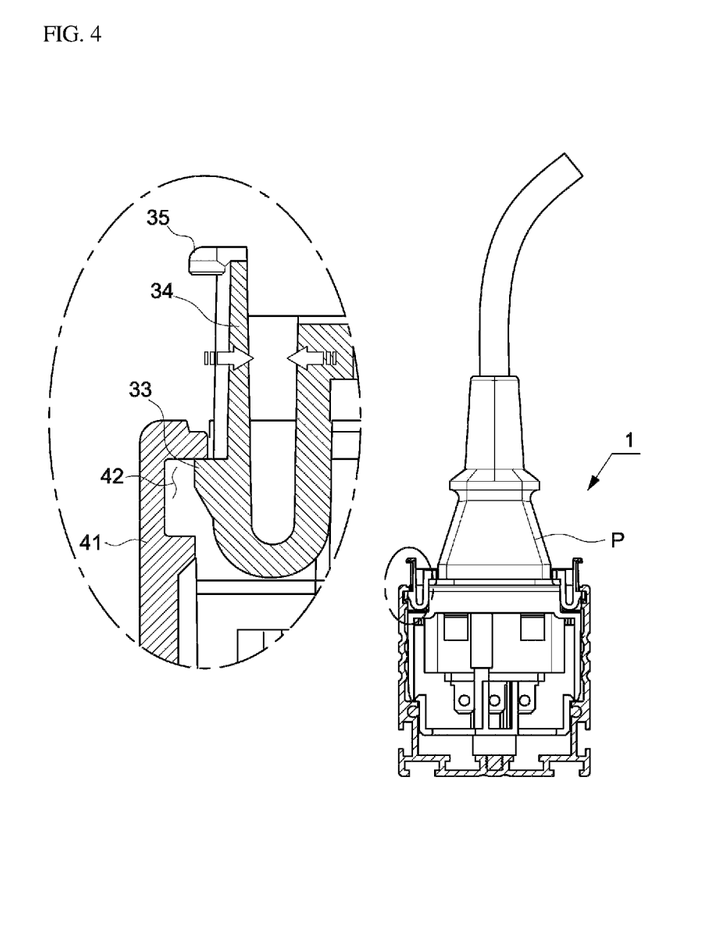
FIG. 4 is a side cross-sectional view showing the operation of the plug fixing means according to the present invention.
Figure 5A:
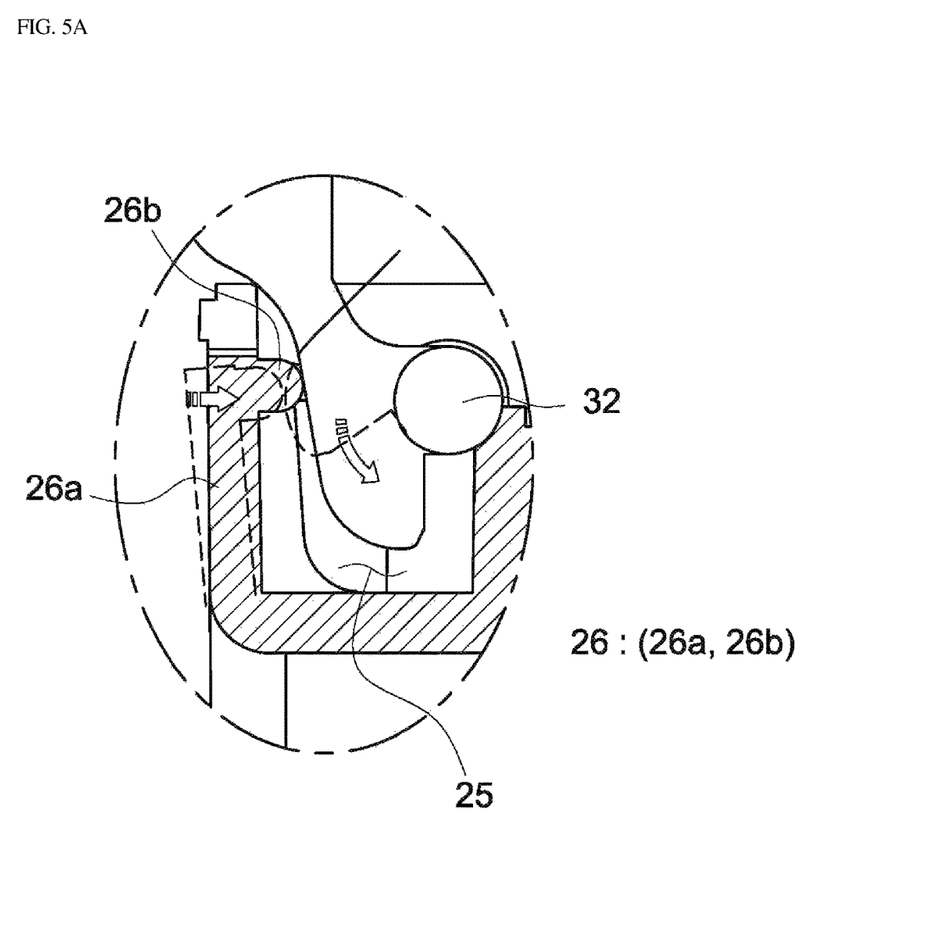
FIGS. 5A and 5B are enlarged views of "A" and "B" portions shown in FIGS. 3A and 3B.
Figure 5B:
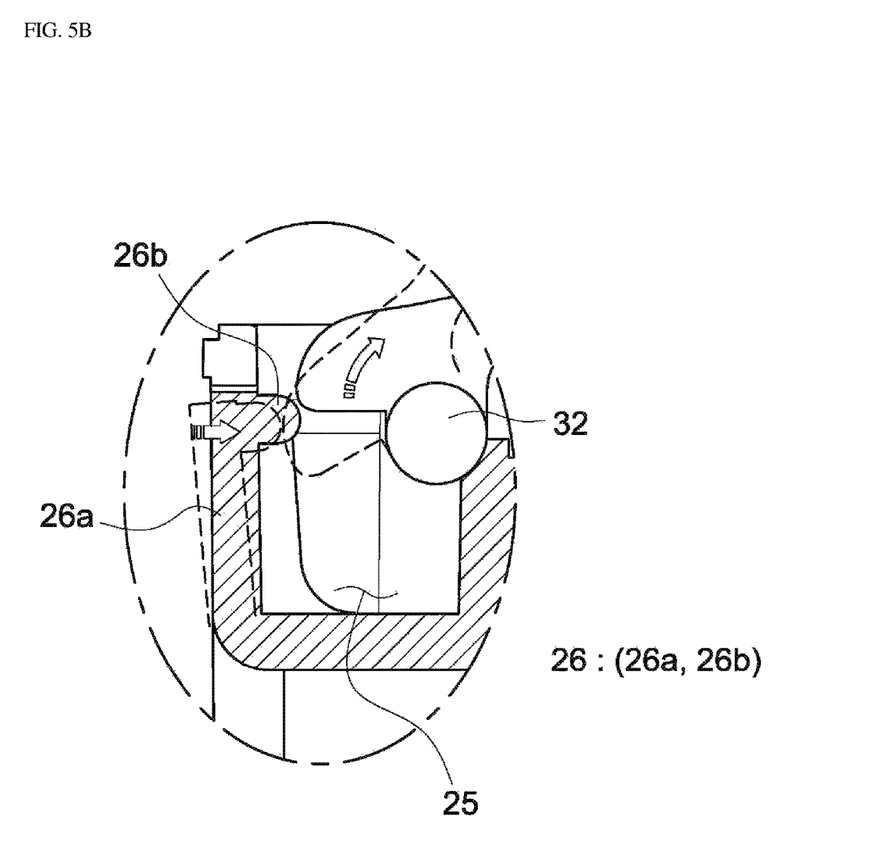

Further, as shown in FIG. 2 or 5, the recess 25 is provided on an inner surface thereof with a rotation guide part 26 elastically pressing the end of the plug fixing means 30 when the plug fixing means is rotated.

Here, the rotation guide part 26 is provided with an elastic piece 26a provided on the inner surface of the recess 25 by being cut from an upper part of the recess to a predetermined depth, and a pressing protrusion 26b extending inwardly from an upper end of the elastic piece 26a.

Meanwhile, the pressing protrusion 26b may have a hemispherical shape in cross section.

The operation of the power distribution apparatus with the rotary-opening/closing type plug fixing means for the communication equipment rack according to the present invention will be described below.

The power distribution apparatus with the rotary-opening/closing type plug fixing means for the communication equipment rack according to the present invention is the power distribution apparatus 1 for the communication equipment rack, wherein the plurality of power plugs P are connected with the power distribution apparatus.

In other words, the present invention relates to the power distribution apparatus 1 for the communication equipment rack having a plurality of communication equipment and electronic equipment, the power distribution apparatus transferring power with the power plugs P connected thereto. The connection failure of the power plugs P, which results from accidentally touching other power plugs P when each plug P is connected to the power distribution apparatus, can be prevented by providing the plug fixing means 30 rotated in one direction, that is, rotated in a hinged manner.

Here, as shown in FIGS. 1 to 4, the plug fixing means 30 may be formed in a "U" shape such that the plug fixing means can be rotatably opened and closed without being interfered by the power plug P connected through a center of the plug fixing means, and a U-shaped inner lower end surface h1 presses and fixes the surface of the upper part of the power plug P, that is, the three surfaces of the plug locking step h. Thus, when the connection of the power plug P is performed in the power distribution apparatus provided in a narrow communication equipment rack, it is possible to prevent connection failure by fixing the power plug P with the plug fixing means 30 rotated in one direction.

Meanwhile, the slide part 20 is provided at the end of the upper part thereof with the hinge hole 23, and the plug fixing means 30 is provided at the end thereof with the hinge protrusion 30 inserted into the hinge hole 23. Thus, the plug fixing means 30 can be rotated above the slide part 20 and the plug connection part 10.

Further, the slide part 20 is provided at the end of the upper part thereof with the seat step 24 such that the plug fixing means 30 can be fixed to the casing part 40, and the plug fixing means 30 is provided at the end thereof with the snap protrusion 33. Thus, the plug fixing means 30 rotated in one direction is fixed to the casing part 40 and thus the connected power plug P can be locked.

Here, the plug fixing means 30 is provided at the end thereof with the U-shaped tension part 34 extending downward and then upward from the plug fixing means 30, such that the snap protrusion 33 can be elastically snapped into the slide groove 42.

Further, the tension part 34 is provided with the grip protrusion 35 protruding outward from the upper end of the tension part, such that the tension part can be prevented from slipping when pressed by the user's hand.

Further, the slide part 20 is provided at the end of the upper part thereof with the recess 25 recessed downward such that the end of the plug fixing means 30 coupled to the slide part is rotated. Thus, the rotation radius of the end of the plug fixing means 30 is prevented from being interfered by the slide part when the plug fixing means 30 is rotated.

Meanwhile, as shown in FIG. 2 or 5, the recess 25 is provided on the inner surface thereof with the rotation guide part 26 elastically pressing the end of the plug fixing means 30 when the plug fixing means 30 is rotated, such that the plug fixing means 30 is pressed to rotate in one direction when being opened or closed.

Here, the rotation guide part 26 is provided with the elastic piece 26a provided on the inner surface of the recess 25 by being cut from the upper portion of the inner surface of the recess, and a pressing protrusion 26b protruding inwardly from an upper end of the elastic piece 26a, such that when the plug fixing means 30 is rotated, an edge of the end thereof comes into press contact with the pressing protrusion 26b and thus the plug fixing means 30 can be rotated in one direction.

Although a preferred embodiment of the present invention has been described for illustrative purposes, those skilled in the art will appreciate that various modifications, additions and substitutions are possible, without departing from the scope and spirit of the invention as disclosed in the accompanying claims.

<Description of the Reference Numerals in the Drawings>

1: power distribution apparatus
10: plug connection part
| 11: plug insertion hole | 12: terminal |
| 20: slide part | 21: seat casing |
| 22: slide protrusion | 23: hinge hole |
| 24: seat step | 25: recess |
| 26: rotation guide part | 26a: elastic piece |
| 26b: pressing protrusioin | 30: plug fixing means |

-continued

<Description of the Reference Numerals in the Drawings>

| | |
|---|---|
| 31: plug insert opening | 32: hinge protrusion |
| 33: snap protrusion | 34: tension part |
| 35: grip protrusion | 40: casing part |
| 41: casing body | 42: slide groove |
| P: power plug | |

The invention claimed is:

1. A power distribution apparatus with a rotary-opening/closing type plug fixing means for a communication equipment rack, wherein a plurality of power plugs (P) is connected with the power distribution apparatus (1), the power distribution apparatus comprising:
   a box-shaped plug connection part (10) provided with a plug insertion hole (11) formed correspondingly to a power plug (P), and a terminal (12) transferring power by being connected to the power plug (P) in the plug insertion hole (11);
   a slide part (20) provided with a box-shaped seat casing (21) open at upper and lower sides thereof such that the plug connection part (10) is inserted into the seat casing (21), and a slide protrusion (22) lengthwisely protruding on each side of the seat casing (21);
   the plug fixing means (30) seated on an upper part of the slide part (20) and provided with a plug insert opening (31) formed by centrally cutting a surface of the plug fixing means (30) in one direction such that the plug fixing means (30) presses downward a surface of an upper part of the power plug (P) when the power plug (P) is connected with the power distribution apparatus; and
   a casing part (40) provided with a rectangular pipe-shaped casing body (41) open at an upper side thereof such that the slide part (20) is seated in the casing body (41), and a slide groove (42) lengthwisely formed on an inner surface of each side of the casing body (41) and into which the slide protrusion (22) is inserted.

2. The power distribution apparatus of claim 1, wherein the slide part (20) is provided at an end of the upper part thereof with a hinge hole (23) formed through an each side of the slide part (20) such that the plug fixing means (30) is hinged to the slide part (20), and
   the plug fixing means (30) is provided at an end thereof with a hinge protrusion (32) protruding from each side of the plug fixing means (30) and rotatably inserted into the hinge hole (23).

3. The power distribution apparatus of claim 1, wherein the slide part (20) is provided at an end of the upper part thereof with a seat step (24) depressed downward, and
   the plug fixing means (30) is provided at an end thereof with a snap protrusion (33) seated in the seat step (24) and snapped into the slide groove (42) when the plug fixing means (30) is closed.

4. The power distribution apparatus of claim 3, wherein the plug fixing means (30) is provided at the end thereof with a U-shaped tension part (34) extending downward and then upward from the plug fixing means (30) such that the snap protrusion (33) is elastically snapped into the slide groove (42).

5. The power distribution apparatus of claim 4, wherein the tension part (34) is provided with a grip protrusion (35) protruding outward from an upper end of the tension part (34) such that the tension part (34) is prevented from slipping when the tension part (34) is pressed by a user's hand.

6. The power distribution apparatus of claim 1, wherein the slide part (20) is provided at an end of the upper part thereof with a recess (25) recessed downward such that an end of the plug fixing means (30) coupled to the slide part is rotated.

7. The power distribution apparatus of claim 6, wherein the recess (25) is provided on an inner surface thereof with a rotation guide part (26) elastically pressing the end of the plug fixing means (30) when the plug fixing means (30) is rotated,
   wherein the rotation guide part (26) is provided with an elastic piece (26a) provided on the inner surface of the recess (25) by being cut from an upper portion of the inner surface of the recess (25) to a predetermined depth, and a pressing protrusion (26b) protruding inwardly from an upper end of the elastic piece (26a).

* * * * *